United States Patent
Pflueger

(10) Patent No.: US 12,365,352 B2
(45) Date of Patent: Jul. 22, 2025

(54) METHOD FOR DETERMINING AN OBJECT'S POSITION USING DIFFERENT ITEMS OF SENSOR INFORMATION

(71) Applicant: Robert Bosch GmbH, Stuttgart (DE)

(72) Inventor: Doris Pflueger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 328 days.

(21) Appl. No.: 17/753,656

(22) PCT Filed: Aug. 13, 2020

(86) PCT No.: PCT/EP2020/072804
§ 371 (c)(1),
(2) Date: Mar. 10, 2022

(87) PCT Pub. No.: WO2021/047856
PCT Pub. Date: Mar. 18, 2021

(65) Prior Publication Data
US 2022/0289220 A1   Sep. 15, 2022

(30) Foreign Application Priority Data

Sep. 12, 2019   (DE) ...................... 10 2019 213 916.7

(51) Int. Cl.
*B60W 50/06* (2006.01)
*G01S 5/02* (2010.01)

(52) U.S. Cl.
CPC ........... *B60W 50/06* (2013.01); *G01S 5/0294* (2013.01); *B60W 2420/408* (2024.01); *B60W 2554/4041* (2020.02)

(58) Field of Classification Search
CPC ........... B60W 50/06; B60W 2420/408; B60W 2554/4041; G01S 5/0294; G01S 19/20
See application file for complete search history.

(56) References Cited

U.S. PATENT DOCUMENTS

| | | | | |
|---|---|---|---|---|
| 2014/0188774 | A1* | 7/2014 | George | G06N 7/08 706/46 |
| 2016/0109579 | A1* | 4/2016 | Navarro Madrid | G01S 19/393 342/357.62 |

(Continued)

FOREIGN PATENT DOCUMENTS

EP   0 161 668 A2   11/1985

OTHER PUBLICATIONS

Translation of Ramm, "Evaluation from Filter approaches for the position estimation of Vehicles with the tools of the Sensitivity analysis", Institute for Applications of Geodasia in Construction University Stuttgart to Ramm, cited by Applicant (Year: 2008).*

(Continued)

*Primary Examiner* — Kenneth J Malkowski
(74) *Attorney, Agent, or Firm* — Maginot, Moore & Beck LLP

(57) ABSTRACT

A method for determining an object's position using different items of sensor information includes: a) reading the sensor information into a Kalman filter, b) merging the sensor information with the Kalman filter, with the Kalman filter supplying as a result estimated values for states and information associated with the estimated values regarding the accuracy of the estimates, c) monitoring the results of the Kalman filter by estimating a probability of accuracy, with which the estimation error lies within an error band, with the probability of accuracy being determined on the basis of a plurality of conditional probabilities, the conditions for which each relate to estimation errors from at least one earlier series.

9 Claims, 2 Drawing Sheets

(56) References Cited

U.S. PATENT DOCUMENTS

| | | | |
|---|---|---|---|
| 2021/0001868 A1* | 1/2021 | Ahn | G06F 17/11 |
| 2021/0011461 A1* | 1/2021 | Fowler | G06N 5/01 |
| 2021/0012593 A1* | 1/2021 | Hassaan | G07C 5/0808 |

OTHER PUBLICATIONS

"Probability inequalities of the Tchebycheff Type" to Savage, National Bureau of Standards Report, 1952 (Year: 1952).*

International Search Report corresponding to PCT Application No. PCT/EP2020/072804, mailed Nov. 13, 2020 (German and English language document) (8 pages).

Ramm, Katrin; "Evaluation von Filter-Ansätzen für die Positionsschätzung von Fahrzeugen mit den Werkzeugen der Sensitivitätsanalyse" Dissertationen, Reihe C, Heft Nr. 619, München, Jan. 1, 2008, pp. 1-120, XP055746548, Retrieved from the Internet: https://dgk.badw.de/fileadmin/user_upload/Files/DGK/docs/c-619.pdf.

Savage, Richard; Probability Inequalities of the Tchebycheff Type, Journal of Research of the National Bureau of Standards—B. Mathematics and Mathematical Physics, vol. 65B, No. 3, Jul.-Sep. 1961, May 23, 1961.

Linzmeier, D., "Sensor- und Objectkmodell Gestuetzte Assoziation Mit Kalman-Filtern", Diplomarbeit Universitaet ULM, May 1, 2003, XP001204416 (104 pages).

* cited by examiner

METHOD FOR DETERMINING AN OBJECT'S POSITION USING DIFFERENT ITEMS OF SENSOR INFORMATION

This application is a 35 U.S.C. § 371 National Stage Application of PCT/EP2020/072804, filed on Aug. 13, 2020, which claims the benefit of priority to Serial No. DE 10 2019 213 916.7, filed on Sep. 12, 2019 in Germany, the disclosures of which are incorporated herein by reference in their entirety.

The disclosure relates to a method for determining an object position by using different sensor information items, to a computer program, to a machine-readable storage medium and to a controller for a motor vehicle. The disclosure may, in particular, be used for actively detecting the convergence of a Kalman filter.

BACKGROUND

In the literature, the convergence of the Kalman filter usually refers to asymptotic convergence. That is to say for $t \to \infty$ the estimation error X tends toward zero. Most solution approaches in this case relate to the so-called "stochastic stability lemma". This lemma indicates conditions under which a stochastic process is exponentially bounded. Bounds for the asymptotic convergence of a Kalman filter may furthermore be derived. Since the requirements for deriving these bounds are very strong, weakened requirements may also be derived. These results, however, are merely of purely theoretical use since they apply only for $t \to \infty$ and concrete bounds for actual errors therefore generally cannot be given. An exception may exist in the case of linear Kalman filters. In this context, corresponding bounds for the actual error may also be derived, on the basis of the Kalman filter equations. However, the results are valid only for the linear Kalman filter. Widening to an extended Kalman filter has to date not been demonstrated. Moreover, in the aforementioned exception an input in the prediction step is not taken into account and certain prior knowledge about the noise, the covariances and the initialization error are required.

Furthermore, the derived bound is very inaccurate since the probabilistic nature of the error is not jointly taken into account.

SUMMARY

A method for determining an object position by using different sensor information items is specified here, comprising at least the following steps:
a) reading the sensor information items into a Kalman filter,
b) fusion of the sensor information items using the Kalman filter, the Kalman filter delivering as a result estimated values for states and information, associated with these estimated values, concerning the accuracy of the estimations,
c) monitoring the results of the Kalman filter by estimating an accuracy probability with which the estimation error lies within an error band, the accuracy probability being established by employing a plurality of conditional probabilities, the conditions of which respectively relate to estimation errors from at least one earlier time step.

In step a), the sensor information items are read into a Kalman filter. The sensor information items may, for example, be information items of one or more of the following sensors: environmental sensor, such as optical sensor (camera, LIDAR), acoustic sensor (ultrasound sensor), RADAR sensor and/or position sensor, such as GNSS sensor. GNSS stands for global navigation satellite system. In step a) sensor information items of different sensors are preferably read in.

In step b), fusion of the sensor information items is carried out using the Kalman filter, the Kalman filter delivering as a result estimated values for states and information, associated with these estimated values, concerning the accuracy of the estimations. The associated information concerning the accuracy of the estimations may, for example, be variances which are associated with the estimated values.

In step c), monitoring of the results of the Kalman filter is carried out by estimating an accuracy probability with which the estimation error (of a particular time step) lies within an error band, the accuracy probability being established by employing a plurality of conditional probabilities, the conditions of which respectively relate to estimation errors from at least one earlier time step (i.e. a time step which chronologically precedes the particular time step).

Conditional probability is the probability of the occurrence of an event under the condition that the occurrence of another event is already known. Step c) is used in particular for (active) monitoring or detection of the convergence of the Kalman filter.

According to one advantageous configuration, it is proposed that bounds for the conditional probabilities are established in step c). In this case, at least one or more of the following bounds may be derived or established in step c): $P(|X_t|>\varepsilon | |X_{t-1}|>\varepsilon)$, $P(|X_t|>\varepsilon | |X_{t-1}|<\varepsilon)$, $P(|X_t|<\varepsilon | |X_{t-1}|>\varepsilon)$ and/or $P(|X_t|<\varepsilon | |X_{t-1}|<\varepsilon)$. These bounds, or probabilities, may also be derived or established for more time steps than the time steps t and t−1. These probabilities may, in particular, be assigned to the edges of a trellis. Subsequently, an (upper) bound for $P(|X_t|>\varepsilon)$ may be derived or established along the edges of the trellis.

According to a further advantageous configuration, it is proposed that the Bienaymé-Tchebycheff inequality and/or the Berge inequality is/are used in order to establish the bounds. In particular, the Bienaymé-Tchebycheff inequality and the Berge inequality are used in order to establish the bounds. The Bienaymé-Tchebycheff inequality and the Berge inequality are given in 'Journal of Research of the National Bureau of Standards—B. Mathematics and Mathematical Statistics 65B.3 (1961)'.

According to a further advantageous configuration, it is proposed that an (upper) bound for the accuracy probability is established with the following formula in step c):

$$\prod_{i=0}^{n-2} \frac{\sigma_{t-i}^2 + \sigma_{t-i-1}^2 + 2\sigma_{t-i}\sigma_{t-i-1}}{(1-\gamma)\max(2\varepsilon^2, \max(0.2\varepsilon - \sigma_{t-i} - \sigma_{t-i-1})^2)} \cdot$$

$$\frac{\sigma_{t-n+1}^2 + \sigma_{t-n}^2 + 2\sigma_{t-n+1}\sigma_{t-n}}{\max(2\varepsilon^2, \max(0.2\varepsilon - \sigma_{t-n+1} - \sigma_{t-n})^2)} +$$

$$\sum_{j=0}^{n-1} \prod_{i=0}^{j-1} \frac{\sigma_{t-i}^2 + \sigma_{t-i-1}^2 + 2\sigma_{t-i}\sigma_{t-i-1}}{(1-\gamma)\max(2\varepsilon^2, \max(0.2\varepsilon - \sigma_{t-i} - \sigma_{t-i-1})^2)}$$

$$\left(\gamma - \frac{\varepsilon^2 - \sigma_{t-j-1}^2 - \sigma_{t-j}^2}{\varepsilon^2}\right) = F(\varepsilon, \gamma, n, \sigma_i)$$

Here, F describes the bound for the accuracy probability as a function of in particular $\varepsilon$, $\gamma$ and $\sigma$. In this case, $\sigma_i^2$ describes the variances of the Kalman filter at the instant i.

Furthermore, ε describes the (maximum acceptable) error. In addition, γ describes the (minimum, or minimum accuracy) probability with which the error should lie within the error band ∓ε.

The accuracy probability $P(|X_t|<\varepsilon)$ may subsequently be estimated as follows from the bound F which has been established:

$$P(|X_t|<\varepsilon) \geq 1-F(\varepsilon,\gamma,n,\sigma_i).$$

According to a further advantageous configuration, it is proposed that, for the estimated values of the Kalman filter, whether with a given (minimum) accuracy probability (symbol γ) they have, or comply with, a (given) acceptable estimation error is established in step c). In other words, this means in particular that F and/or γ may be predetermined, so that a bound for $P(|X_t|<\varepsilon)$ can be established.

The bound actually established in this way for the probability $P(|X_t|<\varepsilon)$ may be compared with the (fixed or predetermined) minimum probability γ. On the basis of this assessment, further measures may then be taken for the corresponding application, for example release for autonomous driving, if the error (with the given accuracy probability) is less than the maximum acceptable error.

According to a further advantageous configuration, it is proposed that the method is carried out in order to determine a vehicle position by using different sensor information items of vehicle sensors. The vehicle position in this case describes, in particular, the geodetic position of a motor vehicle. The vehicle sensors may for example be optical sensors, acoustic sensors, RADAR sensors and/or GNSS sensors. The motor vehicle is preferably an automobile which is configured for automated or autonomous driving operation.

According to a further aspect, a computer program for carrying out a method described here is also proposed. In other words, this relates in particular to a computer program (product) comprising instructions which, when the program is executed by a computer, cause the latter to carry out a method described here.

According to a further aspect, a machine-readable storage medium on which the computer program is stored is also proposed. The machine-readable storage medium is generally a computer-readable data carrier.

According to a further aspect, a controller for a motor vehicle, having a storage medium proposed here, is also proposed. In other words, this means in particular that the storage medium may be part of the controller or may be connected thereto. The controller may in this case, for example, form or be a part of a navigation instrument and/or a controller for the automated or autonomous driving. In particular, the controller may be intended and configured for autonomous operation of the vehicle. The controller may comprise a processor which can access the storage medium in order to execute instructions so as to thereby carry out the method described here.

The details, features and advantageous configurations discussed in connection with the method may also arise correspondingly for the computer program presented here, the storage medium and/or the controller, and vice versa. To this extent, full reference is made to the comments there for further characterization of the features.

BRIEF DESCRIPTION OF THE DRAWINGS

The solution presented here, and its technical environment, will be explained in more detail below with the aid of the figures. It should be pointed out that the disclosure is not intended to be restricted by the exemplary embodiments shown. In particular, unless otherwise explicitly described, it is also possible to extract partial aspects of the situations explained in the figures and combine them with other component parts and/or knowledge from other figures and/or the present description. In the figures.

DETAILED DESCRIPTION

Figure 1:
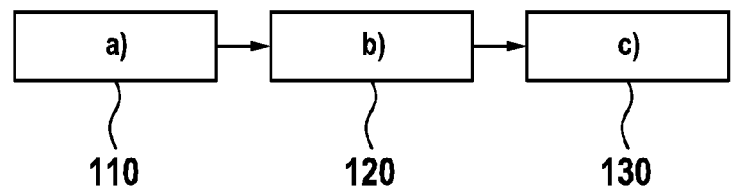
FIG. 1: schematically shows an exemplary flowchart of the described method.

FIG. 1 schematically shows an exemplary flowchart of the described method. The method is used to determine an object position by using different sensor information items. The sequence of steps a), b) and c), represented by the blocks 110, 120 and 130, is exemplary and may be carried out in this way at least once or several times in succession. Furthermore, the steps a), b) and c), in particular the steps b) and c), may also be carried out at least partially in parallel or simultaneously.

In block 110, according to step a) the sensor information items are read into a Kalman filter. In block 120, according to step b) fusion of the sensor information items is carried out using the Kalman filter, the Kalman filter delivering as a result estimated values $x_{estimate}$ for states x and information $\sigma^2$, associated with these estimated values $x_{estimate}$, concerning the accuracy of the estimations. In block 130, according to step c) the results of the Kalman filter are monitored by estimating an accuracy probability $P(|X_t|<\varepsilon)$ with which the estimation error $X=x-x_{estimate}$ lies within an error band ±F, the accuracy probability $P(|X_t|<\varepsilon)$ being established by employing a plurality of conditional probabilities, the conditions of which respectively relate to estimation errors $X_{t-1}$, $X_{t-2}$, ... from at least one earlier time step.

The Kalman filter generally delivers not only an estimation of the states x but also their variances $\sigma^2$. It therefore provides information relating to their robustness. The question is when the estimations of the Kalman filter lie within a particular error tolerance. This is of especial importance in the starting phase since the filter first needs to stabilize after initialization. One fundamental task in the use of Kalman filters is therefore to determine the end of this stabilization process.

This may particularly advantageously be determined using the method. Furthermore, with the presented method it is also possible to determine at any desired later instant whether with a (given) (minimum) probability or a (minimum) accuracy probability (symbol γ) the error lies in a (given) error band (symbol ±ε) and is therefore dependable. For example, a warning may be triggered if the expected errors become too great for the application in question because of inaccurate measurement values.

In particular, a lower bound γ is derived for the probability $P(|x-x_{est}|\leq\varepsilon)\geq\gamma$. Here, ε is a (given) maximum acceptable error. One possible application in this context is as follows: if the difference between the estimated state $x_{est}$ and the real state x is with a sufficiently high probability less than the (given) error limit ε, the estimation is assumed to be reliable.

One particular difficulty in this context is to derive a lower bound γ for the probability $P(|x-x_{est}|\leq\varepsilon)$ without having knowledge relating to the underlying probability distribution and correlation. While a solution on the basis of a normal distribution would be simple to calculate, the general case raises some problems. Here again, for this case a possible solution may particularly advantageously be given by using the Bienaymé-Tchebycheff inequality and/or the Berge inequality in order to establish bounds for the conditional probabilities. The Bienaymé-Tchebycheff inequality used and the Berge inequality used are given in 'R. Savage: "Probability Inequalities of the Tchebycheff Type". In: Journal of Research of the National Bureau of Standards—B. Mathematics and Mathematical Statistics 65B.3 (1961)'.

In this case, as in particular the only assumption, the assumption may be made that the variances from the Kalman filter are not affected by error. Furthermore, in particular model errors and/or measurement outliers are also not taken into account. The methodology applied in the method may be mathematically derived on the basis of this assumption, in particular without further heuristic assumptions. This further advantageously makes it possible to apply the methodology without further adaptations in a very wide variety of fields. In addition, for particularly safety-critical applications, the safeguard is provided that the derived bounds apply reliably and are not merely approximately correct. Of course, the latter is true only with the requirement of validity of the variances calculated by the Kalman filter.

A Kalman filter estimates the states of a process on the basis of the preceding states (prediction) and measured quantities (measurement update). It also calculates the associated variance for each state. The calculation of the estimated variances is correspondingly based on the variance of the preceding state and the variances of the measurement values which are used to calculate the state. These variances are denoted below by $\sigma^2$. Here, t refers to the $t^{th}$ time step of the Kalman filter. The variances deliver information relating to the reliability of the estimation of the states. The relationship between variance and expected error is, however, dependent on the underlying distribution function. If this is unknown, the conversion between variance and error can only be estimated, for example by applying the Chebyshev inequality. If the errors of the states are furthermore correlated, even the Chebyshev inequality can no longer be applied. For this case, a particular advantageous (specific) estimation is derived here:

To this end, the Bienaymé-Tchebycheff inequality and the Berge inequality, as are given for example in 'Journal of Research of the National Bureau of Standards—B. Mathematics and Mathematical Statistics 65B.3 (1961)', are preferably used. They are used to derive bounds for a plurality of conditional probabilities, in particular $P(|X_t|>\varepsilon|\ |X_{t-1}|>\varepsilon)$, $P(|X_t|>\varepsilon|\ |X_{t-1}|<\varepsilon)$, $P(|X_t|<\varepsilon|\ |X_{t-1}|>\varepsilon)$ and $P(|X_t|<\varepsilon|\ |X_{t-1}|<\varepsilon)$.

Figure 2:
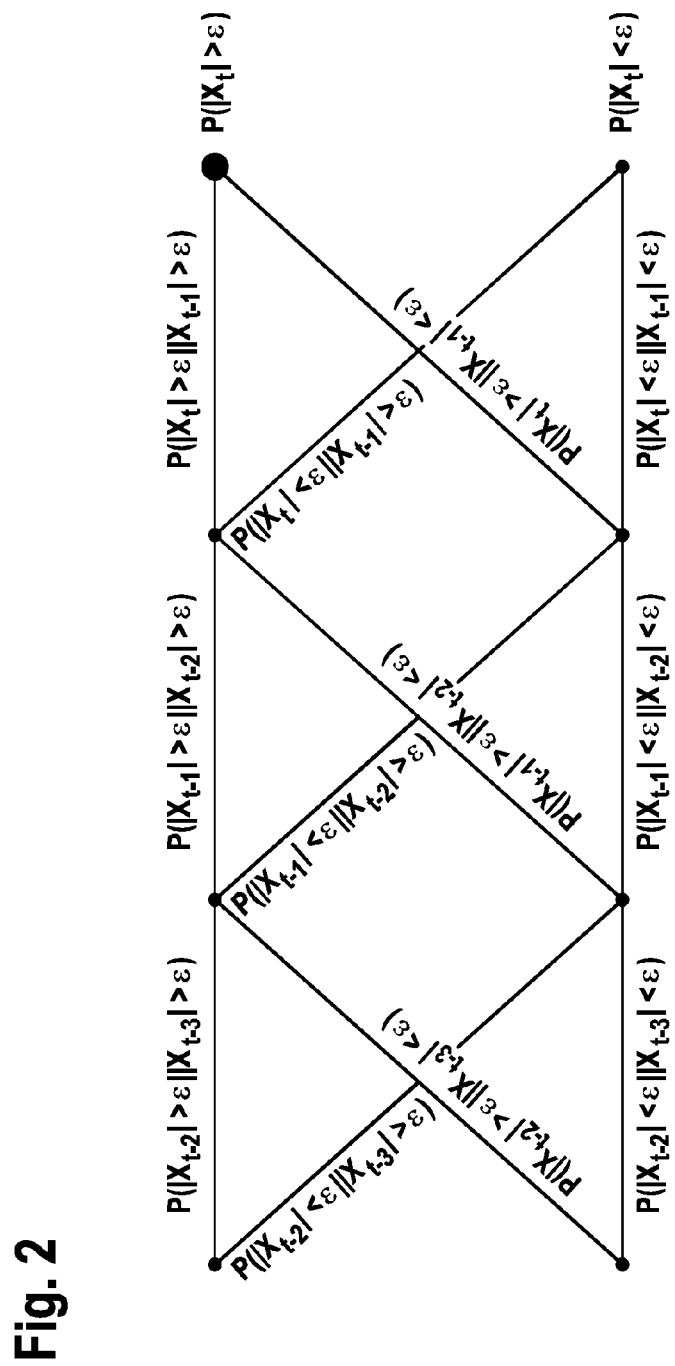
FIG. 2: schematically shows a graphical illustration of an exemplary establishment of the accuracy probability.

These probabilities are assigned to the edges of a trellis. This is represented by way of example in FIG. 2. In this case, the lower edge of the trellis represents the states in which the error limit e is complied with. The upper edge, on the other hand, shows the states in which the error limit e is not complied with but is exceeded.

An upper bound for $P(|X_t|>\varepsilon)$ at the instant t is now derived along the edges of the trellis. The final result uses the variances $\sigma^2$ of the Kalman filter at the instant i:

$$P(|e_t|>\varepsilon) \leq \prod_{i=0}^{n-2} \frac{\sigma_{t-i}^2 + \sigma_{t-i-1}^2 + 2\sigma_{t-i}\sigma_{t-i-1}}{(1-\gamma)\max(2\varepsilon^2, \max(0.2\varepsilon - \sigma_{t-i} - \sigma_{t-i-1})^2)} \cdot$$

$$\frac{\sigma_{t-n+1}^2 + \sigma_{t-n}^2 + 2\sigma_{t-n+1}\sigma_{t-n}}{\max(2\varepsilon^2, \max(0.2\varepsilon - \sigma_{t-n+1} - \sigma_{t-n})^2)} +$$

-continued
$$\sum_{j=0}^{n-1}\prod_{i=0}^{j-1} \frac{\sigma_{t-i}^2 + \sigma_{t-i-1}^2 + 2\sigma_{t-i}\sigma_{t-i-1}}{(1-\gamma)\max(2\varepsilon^2, \max(0.2\varepsilon - \sigma_{t-i} - \sigma_{t-i-1})^2)}$$

$$\left(\gamma - \frac{\varepsilon^2 - \sigma_{t-j-1}^2 - \sigma_{t-j}^2}{\varepsilon^2}\right) = F(\varepsilon, \gamma, n, \sigma_i)$$

Therefore, $$P(|e_t|<\varepsilon) \geq 1 - F(\varepsilon, \gamma, n, \sigma_i)$$

These bounds make it possible to evaluate whether the error $e_t$, or $X_t$, lies with a probability of at least $1-F(\varepsilon,\gamma,n,\sigma_i)$ within an error band $\pm\varepsilon$. For each estimated value $X_{estimate}$ of the Kalman filter, it is therefore possible to indicate whether with a given (minimum, or minimum accuracy) probability $\gamma$ it has an acceptable (estimated) error $e_t$, or $X_t$. In this case, $\gamma$ describes the (minimum, or minimum accuracy) probability with which the error should lie within the error band $\mp\varepsilon$. In other words, $\gamma$ describes a predetermined target parameter for the accuracy probability $P(|X_t|<\varepsilon)$.

This means, in other words, in particular that $\varepsilon$ and/or $\gamma$ may be predetermined, so that a bound for $P(|X_t|<\varepsilon)$ can be established. The bound actually established in this way for the probability $P(|X_t|<\varepsilon)$ may be compared with the (fixed or predetermined) minimum probability $\gamma$. On the basis of this assessment, further measures may then be taken for the corresponding application, for example release for autonomous driving, after stabilization of the filter.

Preferably, the method is carried out in order to determine a vehicle position by using different sensor information items of vehicle sensors. In this case, the described method may possibly be used to decide whether the estimated position may be trusted and the vehicle may drive autonomously.

The method advantageously permits an improvement of the position accuracy. In particular, the methodology presented here permits a valid estimation even in the event of correlated errors.

The invention claimed is:
1. A method for determining a position of an object using different sensor information items, comprising:
   reading the sensor information items into a Kalman filter;
   fusing the sensor information items using the Kalman filter to determine (i) estimated values for states and (ii) information associated with the estimated values indicating an accuracy of the estimated values;
   monitoring the Kalman filter by estimating an accuracy probability that an estimation error lies within an error band $+\varepsilon$, where $\varepsilon$ is a maximum acceptable error, the accuracy probability being estimated by (i) deriving bounds for a plurality of conditional probabilities, (ii) determining an upper bound for the accuracy probability based on the bounds for the plurality of conditional probabilities, and (iii) estimating the accuracy probability based on the upper bound, conditions of the plurality of conditional probabilities respectively depending on other estimation errors from at least one earlier time step; and
   performing, with a controller of a motor vehicle, an autonomous driving operation of the motor vehicle based on the determined position of the object,
   wherein monitoring includes determining the upper bound for the accuracy probability with a following formula:

$$\prod_{i=0}^{n-2} \frac{\sigma_{t-i}^2 + \sigma_{t-i-1}^2 + 2\sigma_{t-i}\sigma_{t-i-1}}{(1-\gamma)\max(2\varepsilon^2, \max(0.2\varepsilon - \sigma_{t-i} - \sigma_{t-i-1})^2)} \cdot$$

$$\frac{\sigma_{t-n+1}^2 + \sigma_{t-n}^2 + 2\sigma_{t-n+1}\sigma_{t-n}}{\max(2\varepsilon^2, \max(0.2\varepsilon - \sigma_{t-n+1} - \sigma_{t-n})^2)} +$$

$$\sum_{j=0}^{n-1} \prod_{i=0}^{j-1} \frac{\sigma_{t-i}^2 + \sigma_{t-i-1}^2 + 2\sigma_{t-i}\sigma_{t-i-1}}{(1-\gamma)\max(2\varepsilon^2, \max(0.2\varepsilon - \sigma_{t-i} - \sigma_{t-i-1})^2)}$$

$$\left(\gamma - \frac{\varepsilon^2 - \sigma_{t-j-1}^2 - \sigma_{t-j}^2}{\varepsilon^2}\right) = F(\varepsilon, \gamma, n, \sigma_i).$$

2. The method as claimed in claim 1, wherein monitoring further comprises:
using a Bienaymé-Tchebycheff inequality and/or a Berge inequality to establish the bounds for the plurality of conditional probabilities.

3. The method as claimed in claim 1, wherein monitoring further comprises:
determining that, with a given minimum accuracy probability, that the estimated values of the Kalman filter have an estimation error that is within the error band.

4. The method as claimed in claim 1, further comprising:
determining a vehicle position using the different sensor information items of vehicle sensors.

5. The method as claimed in claim 1, wherein a computer program is configured to carry out the method.

6. The method as claimed in claim 5, wherein the computer program is stored on a non-transitory machine-readable storage medium.

7. The method as claimed in claim 6, wherein a controller for a motor vehicle includes the storage medium.

8. The method as claimed in claim 3, the performing the autonomous driving operation further comprising:
detecting that that the estimated values of the Kalman filter having the estimation error that is within the error band; and
performing the autonomous driving operation in response to determining that the estimated values of the Kalman filter having the estimation error that is within the error band.

9. The method as claimed in claim 1, the monitoring further comprising:
determining one of (i) that a prior estimation error from an earlier time step is within the error band and (ii) that the prior estimation error from the earlier time step is outside the error band,
wherein the plurality of conditional probabilities includes at least one of:
a first probability that a current at a current time step is less than a maximum acceptable error, given that conditioned upon a prior estimation error from an earlier time step is within the error band;
a second probability that the current estimation error at the current time step is less than the maximum acceptable error, given that the prior estimation error from the earlier time step is outside of the error band;
a third probability that the current estimation error at the current time step is greater than the maximum acceptable error, given that the prior estimation error from the earlier time step is within the error band less; and
a fourth probability that the current estimation error at the current time step is greater than the maximum acceptable error, given that the prior estimation error from the earlier time step is outside of the error band.

* * * * *

UNITED STATES PATENT AND TRADEMARK OFFICE
CERTIFICATE OF CORRECTION

| | |
|---|---|
| PATENT NO. | : 12,365,352 B2 |
| APPLICATION NO. | : 17/753656 |
| DATED | : July 22, 2025 |
| INVENTOR(S) | : Pflueger |

It is certified that error appears in the above-identified patent and that said Letters Patent is hereby corrected as shown below:

In the Claims

In Claim 9, at Column 8, Line 17: "a current at a current time step" should read --a current estimation error at a current time step--.

In Claim 9, at Column 8, Lines 18-19: "given that conditioned upon a prior estimation error" should read --given that a prior estimation error--.

Signed and Sealed this
Twenty-seventh Day of January, 2026

John A. Squires
*Director of the United States Patent and Trademark Office*